United States Patent
Ahmadi et al.

(10) Patent No.: US 11,238,035 B2
(45) Date of Patent: Feb. 1, 2022

(54) PERSONAL INFORMATION INDEXING FOR COLUMNAR DATA STORAGE FORMAT

(71) Applicant: Oracle International Corporation, Redwood Shores, CA (US)

(72) Inventors: Hamed Ahmadi, Coquitlam (CA); Jian Wen, Hollis, NH (US); Shrikumar Hariharasubrahmanian, Palo Alto, CA (US); Sanjay Jinturkar, Santa Clara, CA (US); Nipun Agarwal, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 16/814,855

(22) Filed: Mar. 10, 2020

(65) Prior Publication Data
US 2021/0286806 A1     Sep. 16, 2021

(51) Int. Cl.
*G06F 16/245*     (2019.01)
*G06F 16/22*     (2019.01)

(52) U.S. Cl.
CPC .......... *G06F 16/245* (2019.01); *G06F 16/221* (2019.01); *G06F 16/2228* (2019.01)

(58) Field of Classification Search
CPC ... G06F 16/245; G06F 16/221; G06F 16/2228
See application file for complete search history.

(56) References Cited

U.S. PATENT DOCUMENTS

| | | | |
|---|---|---|---|
| 2009/0287628 A1* | 11/2009 | Indeck | G06F 16/24544 706/47 |
| 2011/0016157 A1* | 1/2011 | Bear | G06F 16/22 707/804 |
| 2013/0086096 A1* | 4/2013 | Indeck | G06F 16/22 707/758 |

(Continued)

FOREIGN PATENT DOCUMENTS

| | | | |
|---|---|---|---|
| CN | 106599052 A | * | 4/2017 |
| CN | 107480260 A | * | 12/2017 |

OTHER PUBLICATIONS

Cho et al. "A Fast Regular Expression Indexing Engine", Proceedings 18th International Conference on Data Engineering, 2002, pp. 419-430, doi: 10.1109/ICDE.2002.994755. (Year: 2002).*

(Continued)

*Primary Examiner* — James E Richardson
(74) *Attorney, Agent, or Firm* — Hickman Becker Bingham Ledesma LLP

(57) ABSTRACT

Techniques are described herein for indexing personal information in columnar data storage format based files. In an embodiment, row groups of rows that comprise a plurality of columns are stored in a set of files. Each column of a row group is stored in a chunk of column pages in the set of files. A regular expression index that indexes a particular column in the set of files is stored for each row group. The regular expression index identifies column pages in the chunk of the particular column that include a particular column value that satisfies a regular expression specified in a query. The (Continued)

regular expression specified in the query in evaluated against the particular column using the regular expression index.

20 Claims, 8 Drawing Sheets

(56) References Cited

U.S. PATENT DOCUMENTS

| | | | | |
|---|---|---|---|---|
| 2016/0239527 | A1* | 8/2016 | Jang | G06F 40/157 |
| 2018/0268000 | A1 | 9/2018 | McManus | |
| 2018/0349422 | A1* | 12/2018 | Tsuchida | G06F 3/0611 |
| 2020/0027010 | A1* | 1/2020 | Lorenc | G06N 3/063 |
| 2020/0125751 | A1* | 4/2020 | Hariharasubrahmanian | |
| | | | | H04L 9/3247 |
| 2020/0210398 | A1 | 7/2020 | Lin | |
| 2020/0250192 | A1* | 8/2020 | Roelke | G06F 16/24554 |
| 2020/0265052 | A1* | 8/2020 | Fujikawa | G06F 16/24569 |
| 2021/0209088 | A1* | 7/2021 | Zheng | G06F 16/245 |

OTHER PUBLICATIONS

Lee et al. "Processing SPARQL queries with regular expressions in RDF databases." BMC bioinformatics vol. 12 Suppl 2,Suppl 2 S6. Mar. 29, 2011, doi: 10.1186/1471-2105-12-S2-S6 (Year: 2011).*
Patil et al. "Inverted indexes for phrases and strings", 2011, In Proceedings of the 34th international ACM SIGIR conference on Research and development in Information Retrieval (SIGIR '11). Association for Computing Machinery, New York, NY, USA, 555-564. DOI:https://doi.org/10.1145/2009916.2009992 (Year: 2011).*
"Index in Parquet", stackoverflow.com, last edited Dec. 31, 2018 [retrieved on Sep. 20, 2021], Retrieved from the Internet: <URL: https://stackoverflow.com/questions/26909543/index-in-parquet> (Year: 2018).*
Parquet-format/README.md, Github.com, Oct. 7, 2019 [retrieved on Sep. 17, 2021], Retrieved from the Internet: <URL: https://github.com/apache/parquet-format/blob/b490da8da82d302f6dadf13fe67633fb1051d79c/README.me> (Year: 2019).*
"Parquet-format/PageIndex.md", Github.com, Jun. 25, 2019 [retrieved on Sep. 17, 2021], Retrieved from the Internet: <URL: https://github.com/apache/parquet-format/blob/b490da8da82d302f6dadf13fe67633fb1051d79c/PageIndex.md> (Year: 2019).*
Rohan Karanjawala, "All You Need To Know About Parquet File Structure In Depth", Jan. 7, 2020 [retrieved on Sep. 20, 2021], Retrieved from the Internet: <URL: https://www.linkedin.com/pulse/all-you-need-know-parquet-file-structure-depth-rohan-karanjawala> (Year: 2020).*

Borók-Nagy et al. "Speeding Up Select Queries with Parquet Page Indexes", Cloudera Blog, Jan. 21, 2020 [retrieved on Sep. 17, 2021], Retrieved from the Internet: <URL: https://blog.cloudera.com/speeding-up-select-queries-with-parquet-page-indexes/> (Year: 2020).*
Yu et al., "Two birds, one stone: a fast, yet lightweight, indexing scheme for modern database systems", dated Nov. 2016, 5 pages.
Wu et al., "Ginix: Generalized Inverted for Keyword Search", IEEE Transactions on Knowledge and Data Mining vol. 8 No. 1 Year 2013, 11 pages.
Wan et al., "When Optimizer Chooses Table Scans: How to Make Them More Responsive", ACM, dated 2018 Association for Computing Machinery, 10 pages.
Twitter Blog, "Dremel made simple with Parquet", dated Sep. 11, 2013, https://blog.twitter.com/engineering/en_us/a/2013/dremel-made-simple-with-parquet.html, 12 pages.
Niwattanakul et al., "Using of Jaccard Coefficient for Keywords Similarity", International MultiConference of Engineers and Computer Scientists 2013 vol. I, dated Mar. 2013, 6, pages.
Microsoft Docs, "Query with Full-Text Search", dated Mar. 14, 2017, 12 pages.
Microsoft Docs, "Columnstore indexes—Query performance", dated Jan. 11, 2019, https://docs.microsoft.com/en-us/sql/relational-databases, 11 pages.
Manber et al., "Glimpse: A Tool to Search Through Entire File Systems", TR 93-34, dated Oct. 1993, 11 pages.
Kononenko et al., "Mining Modern Repositories with Elasticsearch", MSR '14, May 31-Jun. 1, 2014, Hyderabad, India, 4 pages.
Kanchan et al., "Survey paper on Generalized Inverted Index for Keyword Search", e-ISSN: 2278-067X, p-ISSN: 2278-800X, www.ijerd.com, vol. 10, Issue 4 (Apr. 2014), pp. 69-73.
Github.Com, "Analytics querying performance (aka, think about what to do with analytics)", https://github.com/18F/api.data.gov/issues/235, dated May 26, 2015, 27 pages.
Github, "Parquet", parquet-format/README.md, last viewed on Jul. 15, 2020, https://github.com/apache/parquet-format/blob/f1de77d31936f4d50f1286676a0034b6339918ee/README.md 9 pages.
Białecki et al., "Apache Lucene 4", SIGIR 2012 Workshop on Open Source Information Retrieval. Dated August 16, 2012, Portland, OR USA., 8 pages.
Aizawa, Akiko, "An information-theoretic perspective of tf-idf measures", Information Processing and Management 39, dated 2003, 21 pages.
Wikipedia, "Bitmap Index", https://en.wikipedia.org/w/index.php?title=Bitmap_index&oldid=921777233, Oct. 2019, 8 pages.
Melnik et al., "Dremel: Interactive Analysis of Web-Scale Datasets", Association for Computing Machinery, vol. 54, No. 6, Jun. 2011, 10 pages.
Fujioka et al., "Application of Bitmap Index to Information Retrieval", NTT CyberSpace Laboratories, NTT Corporation, WWW 2008/Poster Paper, Apr. 2008, 2 pages.

* cited by examiner

| File Metadata 202 | | |
|---|---|---|
| Row Group 0 Metadata 204 | Column 0 Metadata 210 | File Path 218 |
| | | File Offset in File Path to ColumnMetaData 220 |
| | | ColumnMetadata Replicated 222 |
| | | Offset of First Data Page 224 |
| | | Size of the Above Offset 226 |
| | | Offset of First Index Page 228 |
| | | Size of Above Offset 230 |
| | | Index Type 232 |
| | | Regular Expression Index 234 |
| | | Index Reference 236 |
| | Column 1 Metadata 212 | |
| | Column M Metadata 214 | |
| | Additional Metadata 216 | |
| Row Group 1 Metadata 206 | | |
| Row Group N Metadata 208 | | |

PERSONAL INFORMATION INDEXING FOR COLUMNAR DATA STORAGE FORMAT

FIELD OF THE INVENTION

The present invention relates to data indexing techniques, data storage formatting, and data access techniques.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data can be stored in files according to a column oriented data storage format that organizes data into columns and provides column level access. As an example, Apache Parquet is a self-describing columnar data storage format that embeds a schema, or structure, of a file within the file itself. Apache Parquet is commonly used to ingest and store data in distributed file system or object store file systems for big data processing. The structure of Apache Parquet provides an optimized query performance and reduced I/O requirements.

Frequently, data stored in files with column oriented data storage format include classes of information which may have to be located and retrieved in specific time windows. As an example, sensitive personal information relating to users may have to be located and deleted quickly to adhere to the latest data protection standards such as the General Data Protection Regulation ("GDPR"). For instance, according to "The Right to be Forgotten" clause of the GDPR, a user's stored personal information may have to be identified in multiple files and deleted.

However, while these files provide column-level access, a size of a column of a file structured in a column oriented data storage format can be significantly large. Using current approaches, an entire file or a set of columns that represent a file are required to be scanned to locate requested data, consuming large amount of CPU time, IO, and memory.

Discussed herein are approaches for improving the efficiency of identifying and retrieving specific information from files structured in a column oriented data storage format.

BRIEF DESCRIPTION OF THE DRAWINGS

In the drawings:

FIG. 2 illustrates metadata structure of a columnar data storage format based file.

DETAILED DESCRIPTION

Figure 1:
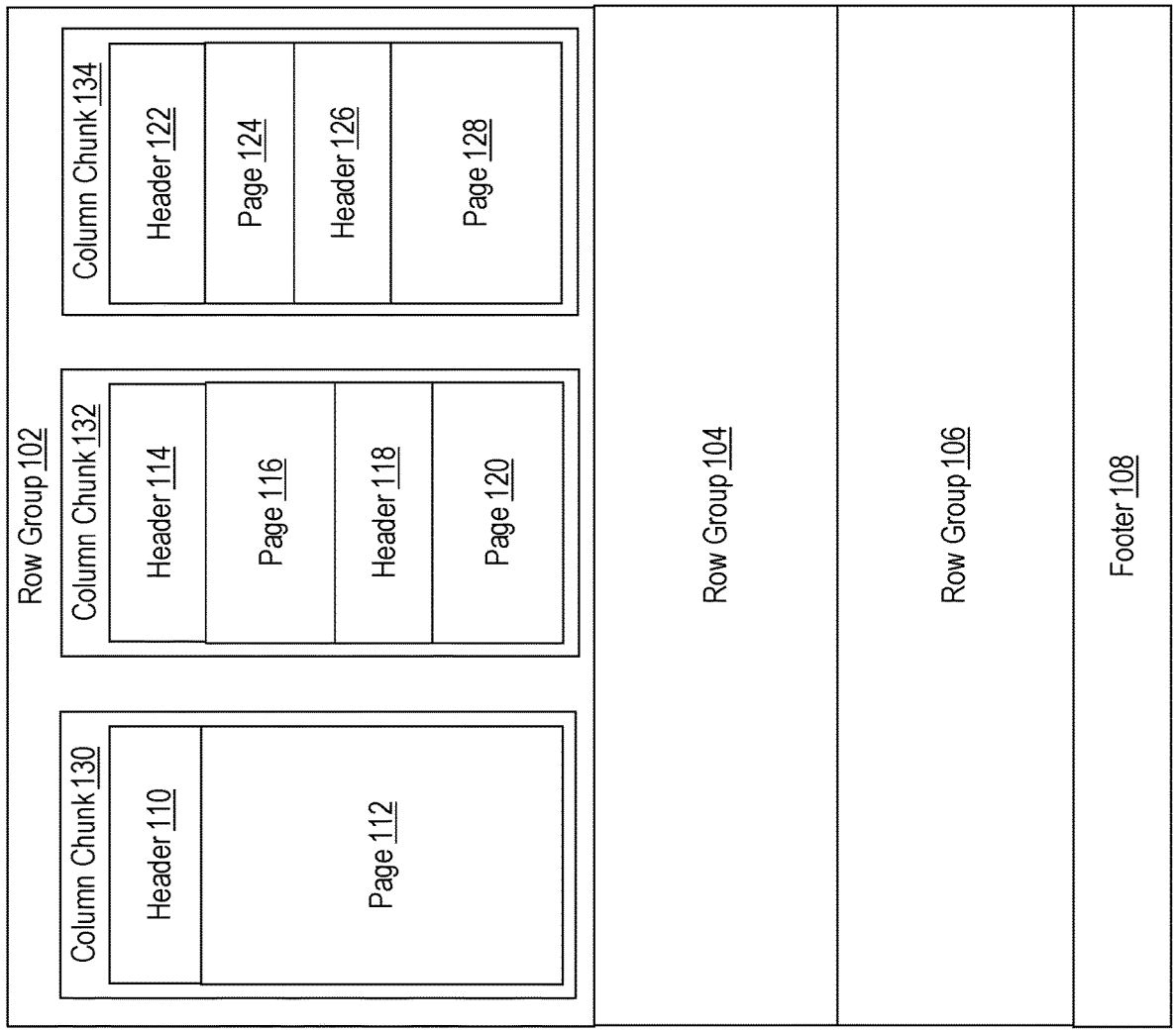
FIG. 1 illustrates an architecture of a columnar data storage format based file.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for indexing personal information in columnar data storage format based files.

Files with columnar data storage format organize data into row groups of rows that comprise multiple columns that each store column pages. Each column of a row group is stored in a chunk of column pages. Metadata is stored in association with each row group that describes data stored in each column included in the row group.

In particular, each row group stores metadata that includes regular expression indexes for each column included in the respective row group. Each regular expression index identifies one or more column pages in the respective chunk of the column that includes a particular column value that satisfies a regular expression.

When a request is received that includes a regular expression and a specified column, the regular expression index that indexes the specified column is accessed to determine a set of column pages that the regular expression index identifies as satisfying the regular expression from the request. The regular expression from the request is then evaluated against the set of column pages to determine column values. Column values are then returned in response to the request.

Thus, techniques discussed herein provide mechanisms to enhance the metadata stored in association with columnar data storage format based files such that the exact column pages and row groups of a file that include values that match a specified set of regular expressions can be quickly identified in a regular expression index. Thus, using techniques discussed herein, pages and row groups not identified by a regular expression index are not evaluated and computing resources such as CPU time, IO, and memory are conserved.

Columnar Data Storage File Format

A file with a columnar data format stores data sequentially by column. Grouping data into columns provides the efficiency of performing computation on specific columns of data. Reading only relevant columns of data that are relevant to a data access request saves compute costs by ignoring irrelevant columns. Storing data sequentially by column allows for faster scanning of the data because all relevant values are stored in close proximity to each other.

An example column-based data storage format is Apache Parquet. An Apache Parquet file is organized into a series of rows called row groups. Each row group contains a set of column chunks that are filled with pages. A page is a block of data stored in persistent storage device (e.g. a block stored in a disk device or in a flash memory). A chunk may comprise a set of blocks stored contiguously within an address space of the persistent storage device, or comprises multiple sets of blocks, each set of blocks being stored contiguously within an address space of the persistent storage device. A file is named set of blocks on a persistent storage device.

In some embodiments, a row group size is matched to the expected block size in the underlying distributed file system or other file-system, and is typically 64, 128, or 256 megabytes. A page is a unit of IO and can be tracked individually from metadata stored in association with a respective file.

FIG. 1 illustrates an architecture of a file with a columnar data format. File 100 includes row groups 102, 104, 106 and footer 108. Three row groups 102, 104, 106 are shown in FIG. 1 but a file may include any number of row groups. Row group 102 includes column chunks 130, 132, 134. Column chunk 132 includes header 110 that corresponds to page 112. Column chunk 132 includes header 114 that corresponds to page 116 and header 118 that corresponds to page 120. Column chunk 134 includes header 122 and page 124. Column chunk 134 includes header 122 that corresponds to page 124 and header 126 that corresponds to page 128. Row groups 104, 106 are depicted in FIG. 1 without column chunks but in some embodiments, may include column chunks similar to row group 102. Each header 110, 114, 118, 122, 126 of the respective column chunk 130, 132, 134 stores metadata for the corresponding page. For example, header 110 stores metadata for page 112. Header 114 stores metadata for page 116, header 118 stores metadata for page 120, etc. Footer 108 stores metadata for file 100, as discussed herein.

Columnar Data Storage Metadata Format

A file with a columnar data format stores metadata that describes a structure of the file. As discussed with respect to FIG. 1, metadata may be stored in a footer of a file or in one more headers of column chunks included in row groups of a file. FIG. 2 illustrates metadata structure of a file with a columnar data format. Metadata format 200 is organized in a hierarchical structure in order of row group metadata at the top of the metadata hierarchy followed by column metadata. Metadata format 200 stores file metadata 202, which may include fields storing a version of the file format, a schema or list of schema elements, a number of rows or row groups in the file, extra key-value pairs, creation information, and column order information. Metadata format 200 stores row group metadata 204, 206, 208 which includes row group N metadata 208 for a N amount row groups that are included in the file. Each row group metadata 204, 206, 208 stores column metadata for up to M columns included in the respective row group 204, 206, 208. For example, row group 0 metadata 202 stores column 0 metadata 210, column 1 metadata 212, and column M metadata 214 indicating that metadata is stored for M columns of row group 0 metadata 204. Each row group metadata 204, 206, 208 stores additional metadata 216 fields that may include a total byte size, number of rows in the respective row group, and a sorting of columns in the row group. Column metadata 210, 212, 214 such as column 0 metadata 210 stores metadata that describes data stored within the respective column. For example, column 0 metadata 210 stores fields that include a file path 218, a file offset in the file path to column metadata 220, replicated column metadata 222, an offset of a first data page 224, a size of the offset of the first data page 226, an offset of a first index page 228, a size of the offset of the first index page 230, an index type 232, a regular expression index 234, and an index reference 236. Index type 232 stores a type of algorithm used to generate regular expression index 234. Regular expression index 234 identifies one or more pages, also referred to herein as "column pages", that are mapped to one or more column values from an associated column that satisfy one or more regular expressions. If the size of a compressed regular expression index 234 is small enough, it is stored in the regular expression index 234 field as an array of bytes. If regular expression index 234 is too large to be stored into column metadata, index reference 236 stores a reference to a file that holds compressed regular expression index 234. The generation of regular expression index 234 is further discussed herein.

A regular expression specifies a pattern for a value (e.g. sequence of characters, string, text) to match. When the value matches the regular expression, the value is referred to herein as satisfying the regular expression. Regular expressions are described in, for example, "Mastering Regular Expressions", by Jeffrey E F Friedl, Aug. 15, 2015.

Ingestion Pipeline

Figure 3:
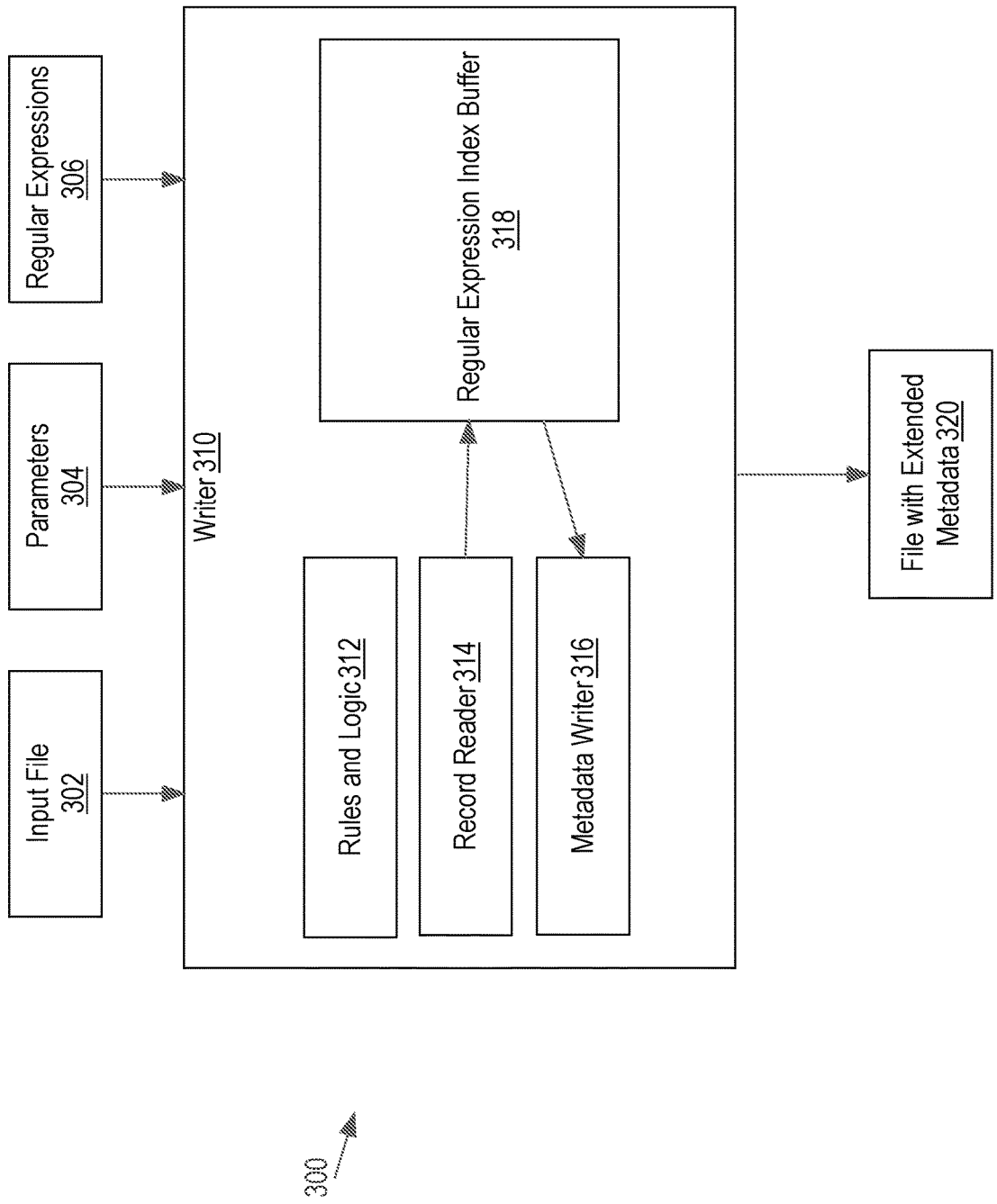
FIG. 3 illustrates a metadata writing system used to generate a regular expression index for columnar data storage format based files.

FIG. 3 illustrates a metadata writing system 300 that may be used to generate a regular expression index for columnar data storage format based files. In the example of FIG. 3, input file 302, parameters 304, and regular expressions 306 are provided as input to writer 310, while file with extended metadata 320 is provided as output of writer 310. Writer 310 may comprise software instructions programmed or configured to generate regular expression indexes. Writer 310 ingests an input file 302 with a columnar data format such as an Apache Parquet file. Writer 310 also ingests parameters 304 and regular expressions 306. Regular expressions 306 may comprise regular expressions provided for each column of the input file 302. Regular expressions 306 may be default regular expressions stored in association with writer 310 or may be specified by a user.

Rules and logic 312 are applied to the input file 302 based on internal logic of writer 310 and/or parameters 304. Record reader 314 sequentially reads records of the input file 302 and stores each record in memory. After each record of the input file 302 is read by the record reader 314, each column of the input file 302 is searched against a respective set of regular expressions provided by regular expressions 306. The column values of the input file 302 that match the respective set of regular expressions are stored alongside the respective page indexes as a regular expression index in regular expression index buffer 318. In some embodiments, a separate buffer is assigned to each column.

Once a regular expression index buffer 318 is generated for each column of the input file 302, metadata writer 316 compresses each column's buffer using a specified algorithm. The type of algorithm used for each column is stored in the index type field 232 in the file metadata. If the size of compressed index is small enough, metadata writer 316 stores the regular expression index as an array of bytes. Otherwise, the regular expression index is stored as a separate file and referenced by the index reference field 236. In this case, the regular expression index field is set to NULL. Metadata writer completes the ingestion pipeline procedure by extending the metadata of the input file 302 by writing each regular expression index to input file 302 to create file with extended metadata 320.

Read Pipeline

Figure 4:
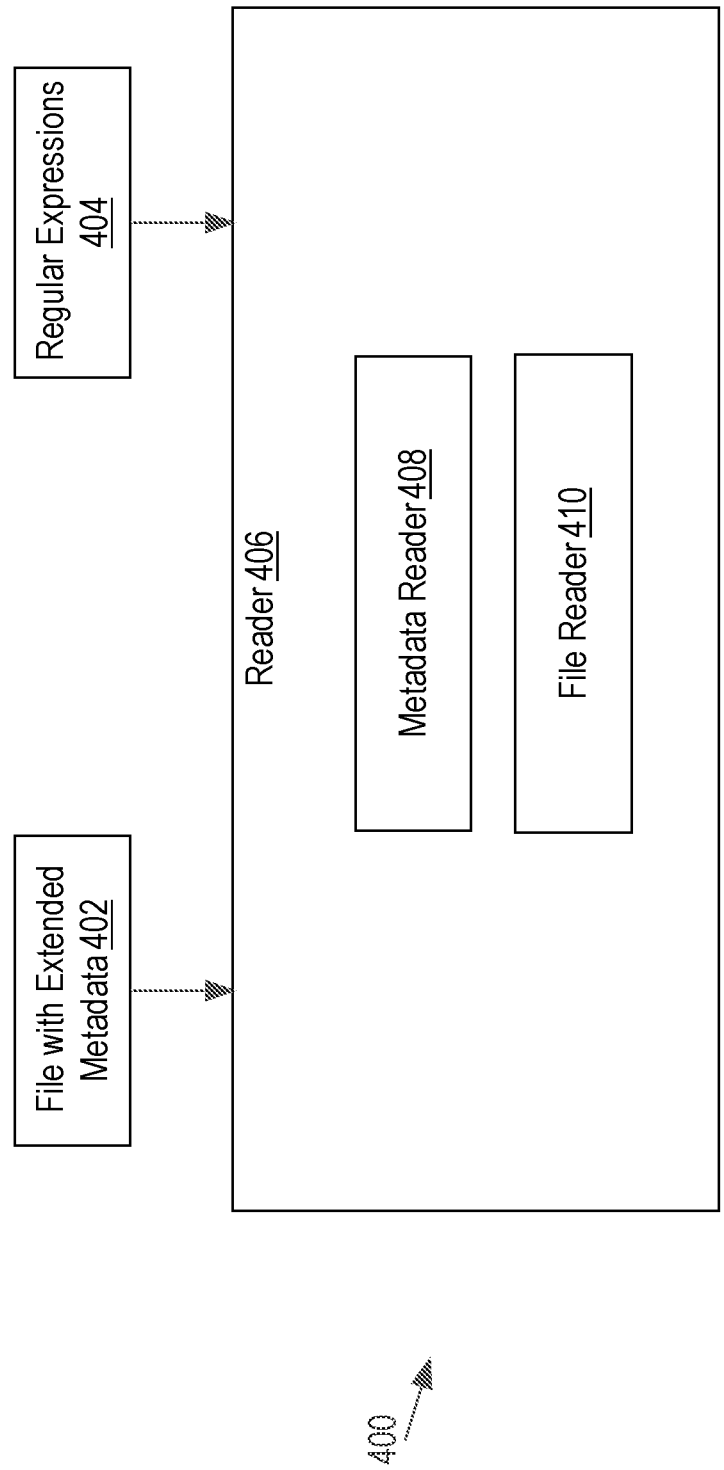
FIG. 4 illustrates a metadata reading system used to query data from columnar data storage format based files.

FIG. 4 illustrates a metadata reading system 400 that may be used to query data from columnar data storage format based files. In the example of FIG. 4, file with extended metadata 402 and regular expressions 404 are provided as input to reader 406. Reader 406 may comprise software instructions programmed or configured to perform predicate pushdown techniques and/or service queries for data included in files with columnar data format.

File with extended metadata 402 may comprise a file with a columnar data format that includes metadata specifying regular expression indexes. In an embodiment, file with extended metadata 402 is generated by metadata writer system 300 from FIG. 3, such as file with extended metadata 320 from FIG. 3. File with extended metadata 402 includes column specific regular expression indexes, as discussed with respect to FIG. 3.

Regular expressions 404 may comprise regular expressions provided for a column. Regular expressions 404 may be included in a query that specifies at least one column of the file with extended metadata 402.

When a query is received that specifies a column and a set regular expressions for the column, metadata reader 408 scans the metadata associated with the file with extended metadata 402 to determine whether a regular expression index exists for the specified column. If a regular expression index is found for the column, index entries from the regular expression index that match the provided regular expressions are identified and the corresponding column pages are extracted. Then, file reader 410 only reads the row groups and column pages that are identified from the regular expression index. Other row groups and/or column pages are skipped.

Predicate Pushdown

Figure 5:
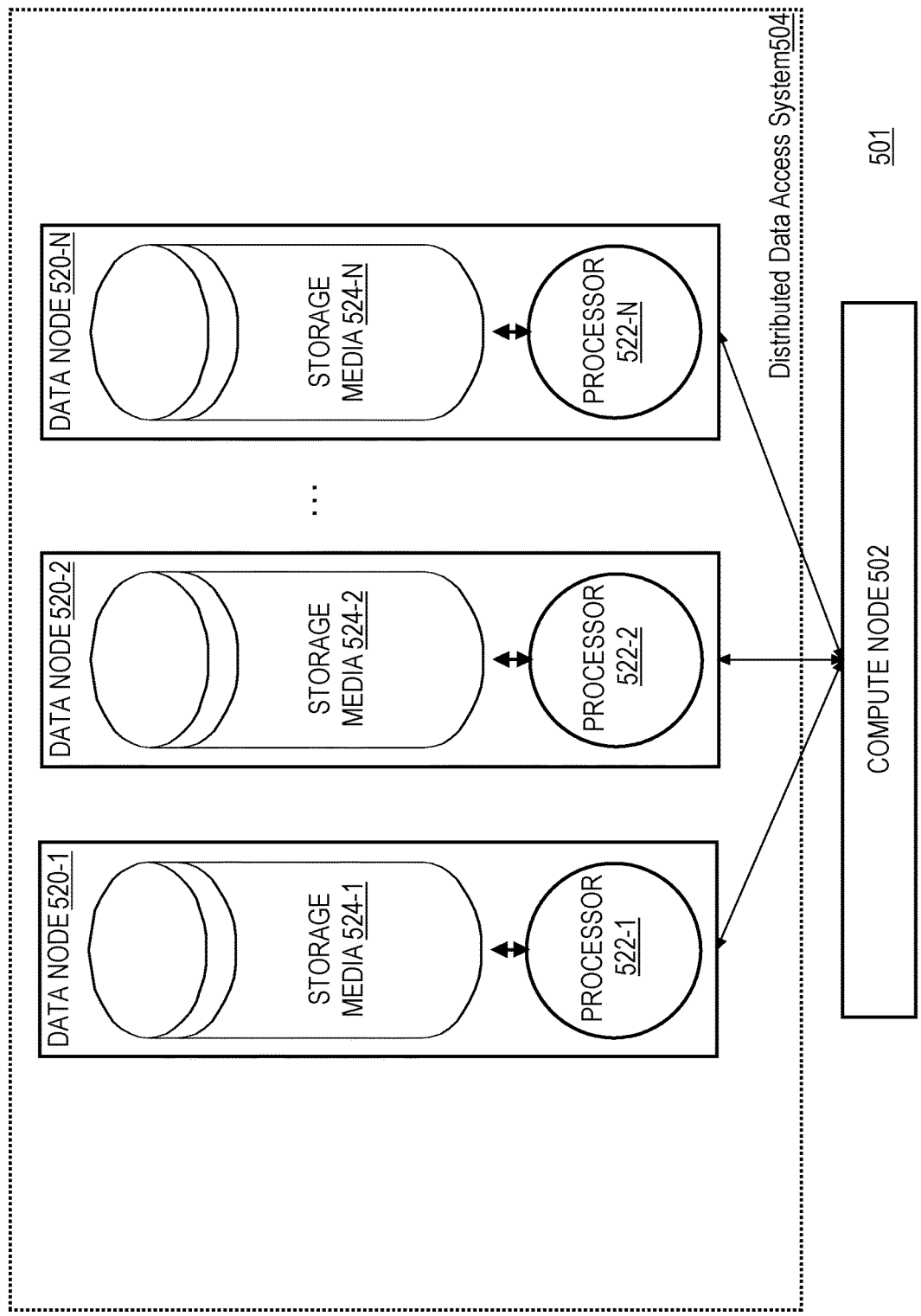
FIG. 5 is a diagram depicting a distributed data access system enabled for predicate pushdown functionality.

Predicate pushdown is an optimization that applies query conditions, such as query predicates, as early as possible, with the goal of preventing any loading of unneeded data records. FIG. 5 is a diagram that depicts a distributed data access system enabled for predicate pushdown functionality, according to an embodiment of the present invention. FIG. 5 depicts Distributed Data Access System 504 according to an embodiment. Distributed Data Access System 504 comprises Data Node 120-1, Data Node 520-2 and Data Node 520-N, as well as other nodes not depicted. Each data node in Distributed Data Access System 504 comprises storage media and one or more processors for processing data stored on the storage media. Storage media may be any form of memory for storing data, including volatile memory, such as DRAM, or non-volatile memory, such as disk storage, flash storage, or PRAM (persistent random access memory). Data Node 520-1 comprises storage media 524-1 and processor 522-1, Data Node 520-2 comprises storage media 524-2 and processor 522-2, and Data Node 520-N comprises storage media 524-N and processor node 522-N.

Compute node 502 comprises one or more servers (not shown) and storage devices (not shown) for performing operations on data. Compute node 502 is coupled over a network connection to Distributed Data Access System 504. Compute node 502 is configured to receive data from data nodes 520-(1-N) such as column pages to be evaluated by the compute node 502. Compute node 502 is also configured to execute queries evaluate by performing operations on specified column pages.

Data nodes are the workers of a distributed data access system that retrieving data from files in storage media. Data nodes may be performed to perform predicate pushdown operations requested by a client in parallel with other data nodes. Performing predicate pushdown operations includes each data node receiving a request or query subexpression that includes a regular expression and evaluating the regular expression.

As discussed herein, a file may be separated into row groups comprising chunks of columns with one or more pages. A row group of a file may be used as a data source for a data node 520-(1-N). When data nodes 520-(1-N) of distributed data access system 504 receive a query with a regular expression predicate specified for a column, each data node 520-(1-N) evaluates the regular expression against the regular expression index metadata from the column of the row group that is designated or assigned to the respective data node 520-(1-N). The result of the evaluation is a qualifying set of column page indexes. The qualifying set of column page indexes are sent to the compute node for evaluation.

Standard predicate pushdown techniques for files with columnar data format has two short comings: 1) predicate pushdown is limited to simple numerical statistics stored in metadata 2) the simple numerical statistics are not suitable to search for string type data such as sensitive and personal information. Using techniques discussed herein, predicate pushdown functionality is enhanced to read the regular expression index from file metadata and utilize it to increase the query execution performance and efficiency. For example, by enabling data nodes 520-(1-N) to support requests that include a set of regular expressions specified for a column, a simple access of the file metadata by data nodes 520-(1-N) can determine whether or not there is an index available for the column. If an index is found, index entries that match the provided regular expressions are identified and the corresponding column pages are extracted and sent over a network to the compute node 502 for evaluation. Because only column pages that hold column values that could satisfy the regular expression are sent, network resources are conserved. Furthermore, compute node 502 is only required to process column pages of a specified column that could satisfy the regular expression indexes instead of reading all column pages of the specified column to evaluate the regular expression, resulting in the conservation of numerous computing resources including CPU time, IO, and memory.

Example Procedure

Figure 6:
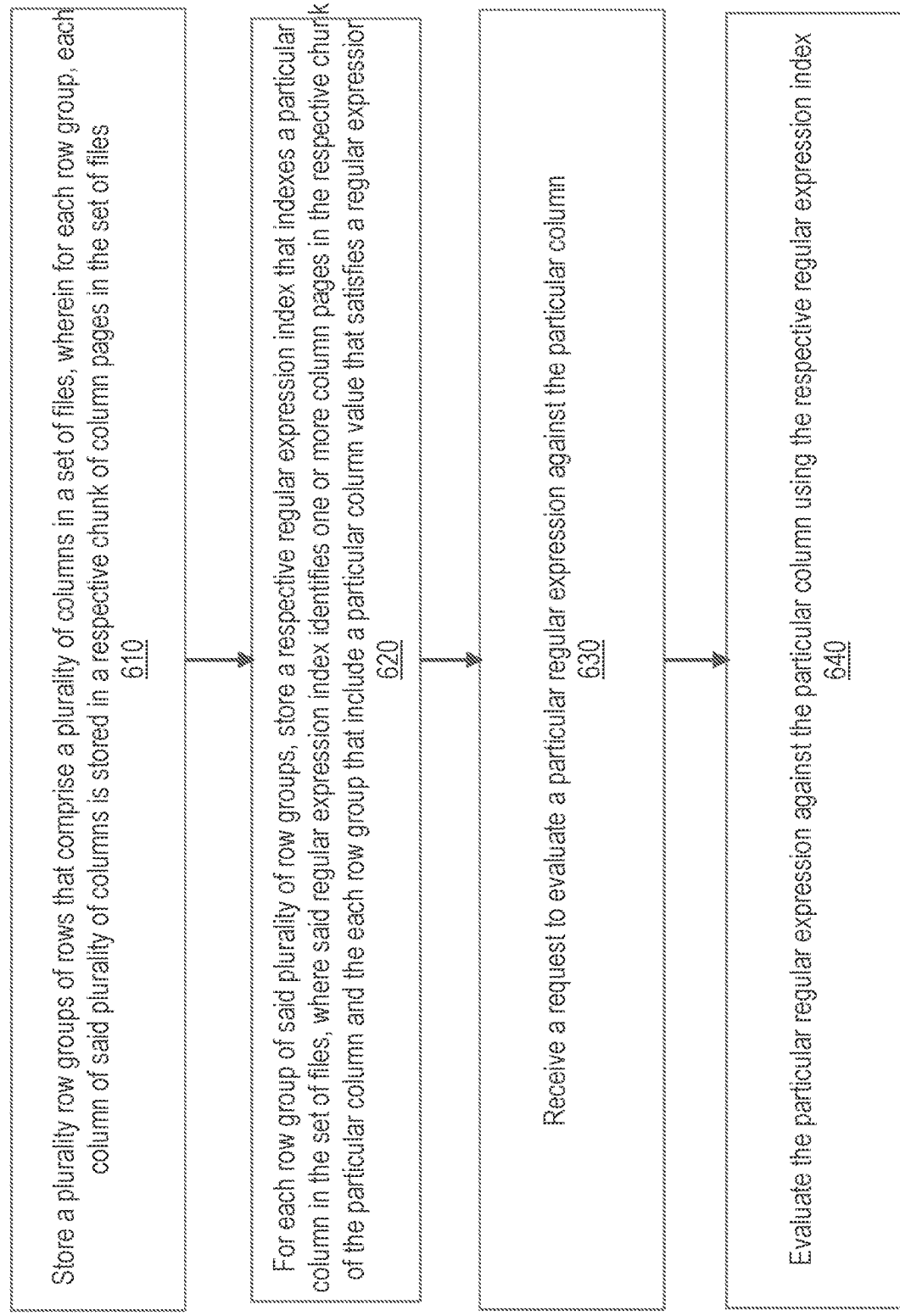
FIG. 6 depicts an example procedure flow for enhanced retrieval of data from columnar data storage format based files.

FIG. 6 shows an example procedure flow 600 for enhanced retrieval of data from columnar data storage format based files. Flow 600 is one example of a flow for enhanced retrieval of data from columnar data storage format based files. Other flows may comprise fewer or additional elements, in varying arrangements. columnar data storage format In step 610, a plurality row groups of rows that comprise a plurality of columns are stored in a set of files. For each row group, each column of the plurality of columns is stored in a respective chunk of column pages in the set of files. For example, FIG. 1 illustrates a file 100 that includes a plurality of row groups 102, 104, 106. Row group 102 is shown as including column chunks 120, 132, 134. Each column chunk 120, 132, 134 includes at least one column page, such as page 112 from column chunk 130.

In step 620, for each row group of the plurality of row groups, a respective regular expression index that indexes a particular column is stored in the set of files. The respective regular expression index identifies one or more column pages in the respective chunk of the particular column and the each row group that include a particular column value that satisfies a regular expression. For example, FIG. 3 illustrates a writer 310 that ingests an input file 302 and regular expressions 306. Record reader 314 scans records of the input file 302 for column values that satisfy regular expressions 306. The column values that satisfy regular expressions 306 are stored, per column, alongside the respective page indexes as a regular expression index and written as extended metadata to the input file.

In step 630, a request is received to evaluate a particular regular expression against the particular column. For example, FIG. 4 illustrates a reader 406 that evaluates regular expression against specified columns. Reader 406 ingests a file with extended metadata, such as a file generated by step 620, and regular expressions 404. Regular expressions specified for a column in a request may be different than regular expressions used for the column at ingest time such as in step 620. For example, at ingest time many kinds of personal data is indexed, while at read time regular expressions are only specified for specific types of personal data such as email addresses.

In step 640, the particular regular expression is evaluated against the particular column using the respective regular expression index. Evaluating the particular regular expression against the particular column includes, for each row group of the plurality of row groups: determining a respective set of column pages that the respective regular expression index identifies as satisfying the particular regular expression and evaluating the particular regular expression against the respective set of column pages. For example, when a query is received that specifies the particular column and the particular regular expression for the particular column, such as the query from step 630, metadata reader 408 scans the metadata associated with file with extended metadata 402 to determine whether a regular expression index exists for the particular column. If a regular expression index exists for the particular column, index entries from the regular expression index that match the particular regular expression are identified and the corresponding column pages are extracted. File reader 410 only reads the row groups and column pages that are identified from the regular expression index. Other row groups and/or column pages are skipped.

Technical Benefits

Techniques discussed herein further enhance the efficiency of accessing column pages stored in columnar data storage format based files. For example, for requests that include a set of regular expressions specified for a column of a file, previous techniques require scanning entire columns and multiple column pages within each column to identify values that satisfy the specified set of regular expressions. Techniques discussed herein provide mechanisms to enhance the metadata stored in association with columnar data storage format based files such that the exact column pages and row groups of a file that include values that match the specified set of regular expressions can be quickly identified in a regular expression index stored in the file metadata without scanning each column of the file to identify values that match the specified set of regular expressions. Thus, using techniques discussed herein, pages and row groups not identified by a regular expression index are not evaluated and computing resources are conserved.

Furthermore, techniques described herein can be used in a variety of domains including any type of data that has a signature that can be identified by a regular expression. For example, personal information represented as strings, numbers, symbols or any combination of strings, numbers, and symbols can be described by one or more regular expressions and indexed using techniques described herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Software Overview

Figure 7:
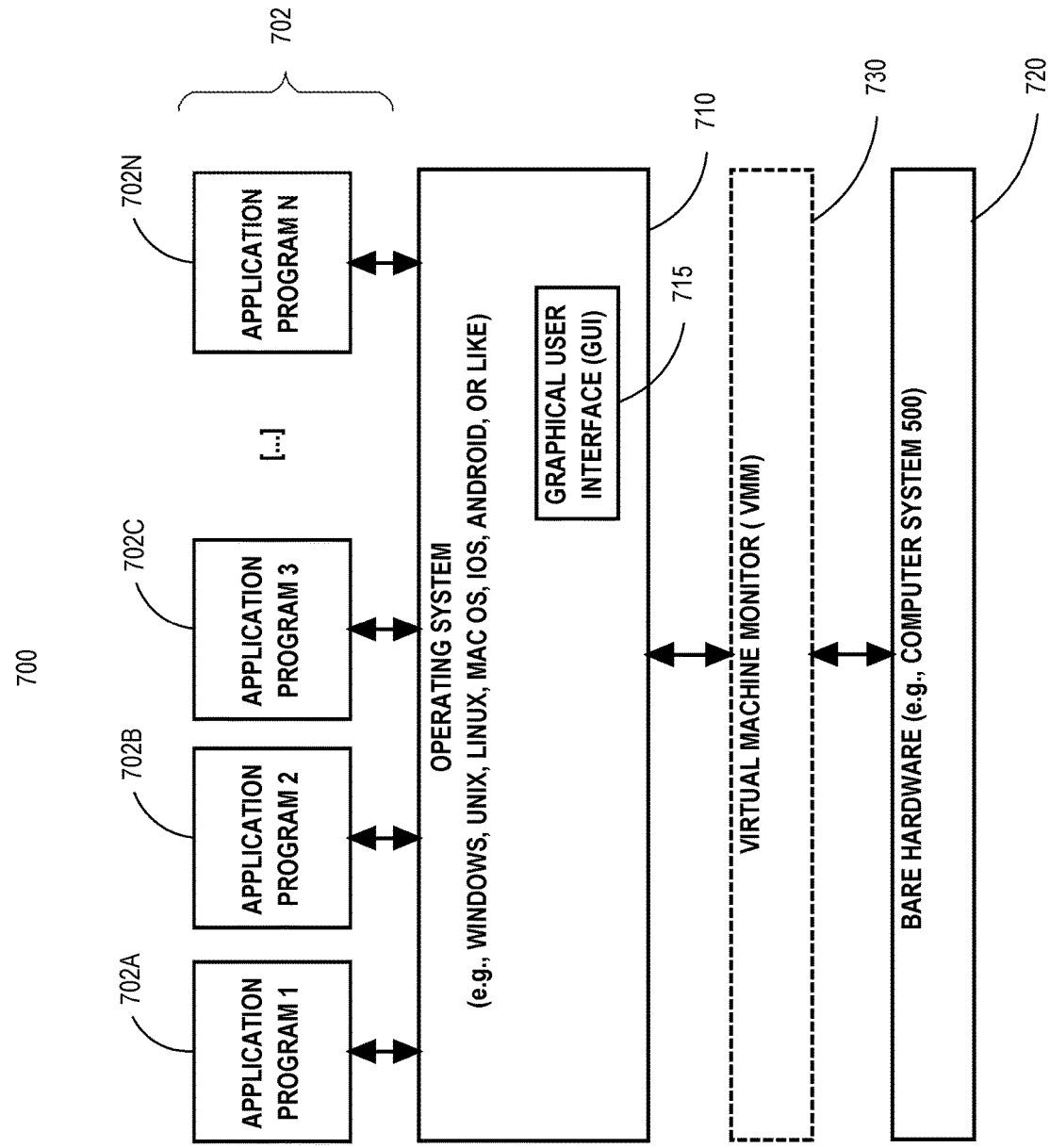
FIG. 7 is a diagram depicting a software system upon which an embodiment of the invention may be implemented.
Figure 8:
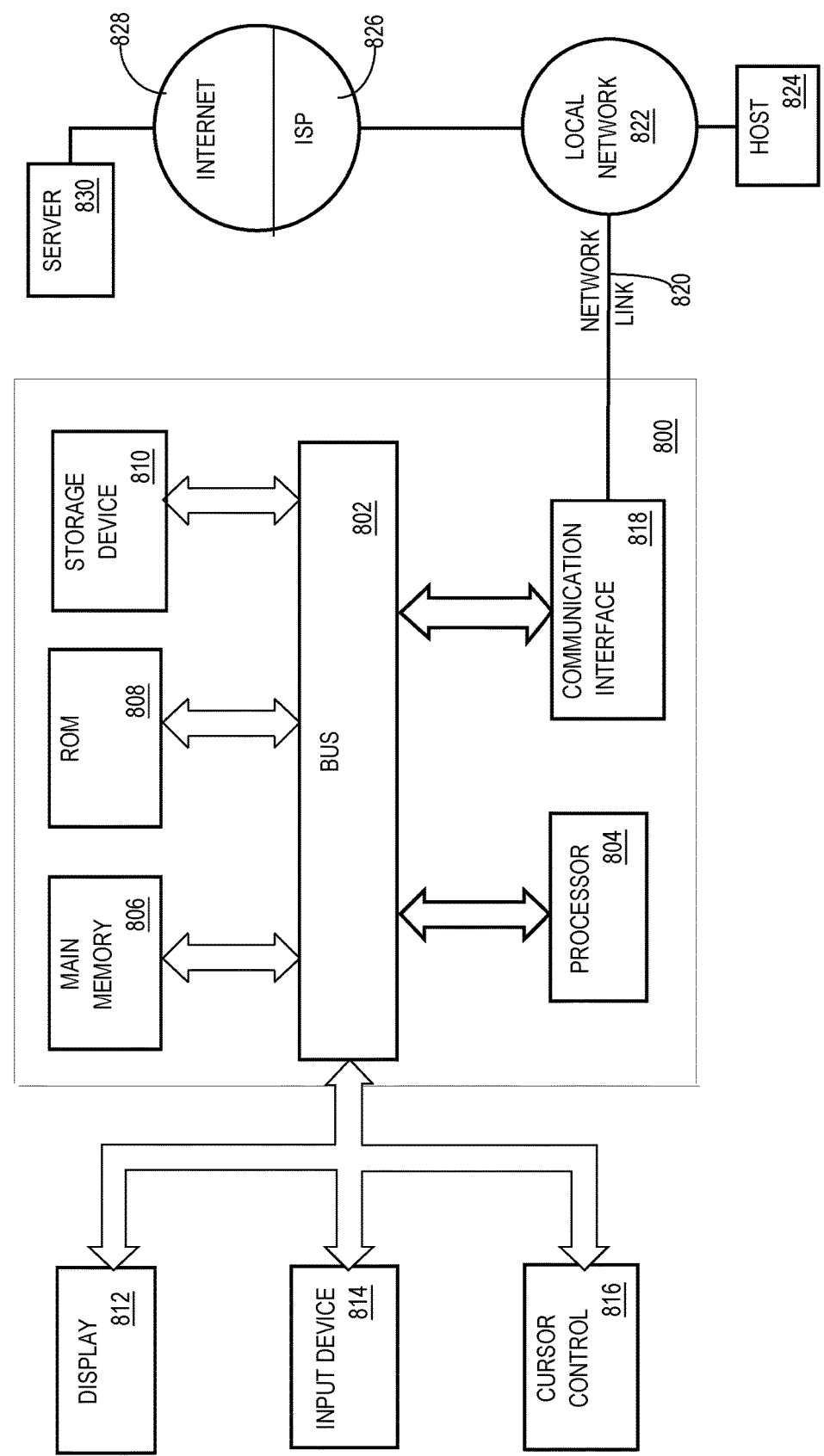
FIG. 8 is a diagram depicting a computer system that may be used in an embodiment of the present invention.

FIG. 7 is a block diagram of a basic software system 700 that may be employed for controlling the operation of computing system 800 of FIG. 8. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 800. Software system 700, which may be stored in system memory (RAM) 707 and on fixed storage (e.g., hard disk or flash memory) 810, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 810 into memory 806) for execution by the system 800. The applications or other software intended for use on computer system 800 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 804) of computer system 800. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 800.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 800 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   storing in a set of files a plurality row groups of rows that comprise a plurality of columns, wherein for each row group, each column of said plurality of columns is stored in a respective chunk of column pages in the set of files;
   for each row group of said plurality of row groups: generating a respective regular expression index that indexes a particular column, determining whether the size of the respective regular expression index is below a threshold, and storing in the set of files said respective regular expression index based on the determination, wherein said regular expression index identifies one or more column pages in the respective chunk of said particular column and said each row group that include a particular column value that satisfies a regular expression.

2. The method of claim 1, further comprising:
   receiving a request to evaluate a particular regular expression against the particular column.

3. The method of claim 2, further comprising:
   for each row group of said plurality of row groups, evaluating the particular regular expression against said particular column using the respective regular expression index that indexes the particular column.

4. The method of claim 3, wherein evaluating the regular expression against the particular column includes:
   for each row group of said plurality of row groups:
      determining a respective set of column pages that the regular expression index identifies as satisfying said regular expression; and
      evaluating the regular expression against the respective set of column pages.

5. The method of claim 2, further comprising:
   determining that a regular expression index exists for the particular column and in response, evaluating the particular regular expression against the particular column.

6. The method of claim 2, further comprising:
determining that a regular expression index does not exist for the particular column and in response, skipping evaluating the particular regular expression against the particular column.

7. The method of claim 2, wherein each data node of a plurality of data nodes stores a row group of the plurality of row groups.

8. The method of claim 7, further comprising:
each data node of the plurality of data nodes determining, for the respective stored row group of the plurality of row groups, a respective set of column pages that the regular expression index identifies as satisfying the particular regular expression;
each data node of the plurality of data nodes transmitting the respective set of column pages to a compute node for evaluation.

9. The method of claim 1, further comprising:
for each row group of the plurality of row groups, scanning metadata associated with the respective row group to determine whether a regular expression index exists for the particular column.

10. The method of claim 1, wherein each file of the set of files is an Apache Parquet file.

11. One or more non-transitory computer-readable media storing instructions which, when executed by one or more processors, cause:
storing in a set of files a plurality row groups of rows that comprise a plurality of columns, wherein for each row group, each column of said plurality of columns is stored in a respective chunk of column pages in the set of files;
for each row group of said plurality of row groups:
generating a respective regular expression index that indexes a particular column, determining whether the size of the respective regular expression index is below a threshold, and storing in the set of files said respective regular expression index based on the determination, wherein said regular expression index identifies one or more column pages in the respective chunk of said particular column and said each row group that include a particular column value that satisfies a regular expression.

12. The one or more non-transitory computer-readable media of claim 11, further comprising instructions which, when executed by the one or more processors, cause:
receiving a request to evaluate a particular regular expression against the particular column.

13. The one or more non-transitory computer-readable media of claim 12, further comprising instructions which, when executed by the one or more processors, cause:
for each row group of said plurality of row groups, evaluating the particular regular expression against said particular column using the respective regular expression index that indexes the particular column.

14. The one or more non-transitory computer-readable media of claim 13, wherein evaluating the regular expression against the particular column includes:
for each row group of said plurality of row groups:
determining a respective set of column pages that the regular expression index identifies as satisfying said regular expression; and
evaluating the regular expression against the respective set of column pages.

15. The one or more non-transitory computer-readable media of claim 12, further comprising instructions which, when executed by the one or more processors, cause:
determining that a regular expression index exists for the particular column and in response, evaluating the particular regular expression against the particular column.

16. The one or more non-transitory computer-readable media of claim 12, further comprising instructions which, when executed by the one or more processors, cause:
determining that a regular expression index does not exist for the particular column and in response, skipping evaluating the particular regular expression against the particular column.

17. The one or more non-transitory computer-readable media of claim 12, wherein each data node of a plurality of data nodes stores a row group of the plurality of row groups.

18. The one or more non-transitory computer-readable media of claim 17, further comprising instructions which, when executed by the one or more processors, cause:
each data node of the plurality of data nodes determining, for the respective stored row group of the plurality of row groups, a respective set of column pages that the regular expression index identifies as satisfying the particular regular expression;
each data node of the plurality of data nodes transmitting the respective set of column pages to a compute node for evaluation.

19. The one or more non-transitory computer-readable media of claim 11, further comprising instructions which, when executed by the one or more processors, cause:
for each row group of the plurality of row groups, scanning metadata associated with the respective row group to determine whether a regular expression index exists for the particular column.

20. The one or more non-transitory computer-readable media of claim 11, wherein each file of the set of files is an Apache Parquet file.

* * * * *

UNITED STATES PATENT AND TRADEMARK OFFICE
CERTIFICATE OF CORRECTION

| | |
|---|---|
| PATENT NO. | : 11,238,035 B2 |
| APPLICATION NO. | : 16/814855 |
| DATED | : February 1, 2022 |
| INVENTOR(S) | : Ahmadi et al. |

It is certified that error appears in the above-identified patent and that said Letters Patent is hereby corrected as shown below:

In the Drawings

On sheet 7 of 8, in FIG. 7, under Reference Numeral 730, Line 1, delete "( VMM)" and insert -- (VMM) --, therefor.

In the Specification

In Column 6, Line 37, delete "format" and insert -- format. --, therefor.

In Column 6, Line 38, after "plurality" insert -- of --.

In the Claims

In Column 12, Line 32, in Claim 1, after "plurality" insert -- of --.

In Column 13, Line 28, in Claim 11, after "plurality" insert -- of --.

Signed and Sealed this
Twelfth Day of July, 2022

Katherine Kelly Vidal
*Director of the United States Patent and Trademark Office*